US010819537B2

United States Patent
Li et al.

(10) Patent No.: US 10,819,537 B2
(45) Date of Patent: Oct. 27, 2020

(54) METHOD AND APPARATUS FOR PROCESSING SERVICE DATA

(71) Applicant: DATANG MOBILE COMMUNICATIONS EQUIPMENT CO., LTD., Beijing (CN)

(72) Inventors: Haimin Li, Beijing (CN); Zhenduo Zheng, Beijing (CN)

(73) Assignee: DATANG MOBILE COMMUNICATIONS EQUIPMENT CO., LTD.

( * ) Notice: Subject to any disclaimer, the term of this patent is extended or adjusted under 35 U.S.C. 154(b) by 0 days.

(21) Appl. No.: 16/466,565

(22) PCT Filed: Dec. 5, 2017

(86) PCT No.: PCT/CN2017/114529
§ 371 (c)(1),
(2) Date: Jun. 4, 2019

(87) PCT Pub. No.: WO2018/103613
PCT Pub. Date: Jun. 14, 2018

(65) Prior Publication Data
US 2019/0356511 A1  Nov. 21, 2019

(30) Foreign Application Priority Data
Dec. 5, 2016 (CN) .......................... 2016 1 1104697

(51) Int. Cl.
*H04L 12/28* (2006.01)
*H04L 12/46* (2006.01)
(Continued)

(52) U.S. Cl.
CPC .......... *H04L 12/4633* (2013.01); *H04L 45/72* (2013.01); *H04W 40/248* (2013.01)

(58) Field of Classification Search
None
See application file for complete search history.

(56) References Cited

U.S. PATENT DOCUMENTS 9,479,433 B1  10/2016 Lewis et al.
2003/0174706 A1  9/2003 Shankar et al.
(Continued)

FOREIGN PATENT DOCUMENTS

CN  101163100 A  4/2008
CN  101309284 A  11/2008
(Continued)

OTHER PUBLICATIONS

International Search Report; Application No. PCT/CN2017/114529; dated Feb. 13, 2018; English Translation Attached.

*Primary Examiner* — Clemence S Han
(74) *Attorney, Agent, or Firm* — Nath, Goldberg & Meyer; Joshua B. Goldberg (57) ABSTRACT

Embodiments of the present disclosure provide a method and an apparatus for processing service data. The method includes: receiving an uplink service flow, wherein the uplink service flow includes a first tunnel identifier and a destination address; determining a first tunnel mapping table corresponding to the first tunnel identifier, wherein the first tunnel mapping table includes the first tunnel identifier, one or more second tunnel identifiers corresponding to the first tunnel identifier, and one or more service addresses corresponding to each of the second tunnel identifiers; searching a service address the same as the destination address from the first tunnel mapping table; determining the second tunnel identifier of the uplink service flow based on the destination address if the searching is failed; and transmitting the uplink service flow to a service anchor corresponding to the second tunnel identifier of the uplink service flow.

14 Claims, 5 Drawing Sheets

(51) Int. Cl.
*H04L 12/721* (2013.01)
*H04W 40/24* (2009.01)

(56) References Cited

U.S. PATENT DOCUMENTS

2012/0140697 A1\* 6/2012 Chen .................... H04W 28/06
370/315
2012/0224578 A1\* 9/2012 Mih Ly ............... H04L 12/4633
370/392

FOREIGN PATENT DOCUMENTS

| CN | 104660478 A | 5/2015 |
| CN | 105490884 A | 4/2016 |

\* cited by examiner

METHOD AND APPARATUS FOR PROCESSING SERVICE DATA

CROSS-REFERENCE TO RELATED APPLICATIONS

This is a National Phase Application filed under 35 U.S.C. 371 as a national stage of PCT/CN2017/114529, filed Dec. 5, 2017, and which claims priority to Chinese Patent Application No. 201611104697.2, titled "METHOD AND APPARATUS FOR PROCESSING SERVICE DATA" and filed to the State Intellectual Property Office on Dec. 5, 2016, the entire contents of which are incorporated herein by reference.

FIELD OF TECHNOLOGY

The present disclosure generally relates to the field of communication technologies, and more particularly, to a method for processing service data and an apparatus for processing service data.

BACKGROUND

In a mobile communication core network, a user plane uses GTP (GPRS Tunneling Protocol) protocol to forward service data packets. The GTP is a set of IP-based communication protocols for supporting General Packet Radio Service (GPRS). The GTP is first used in the 2/3G core network and is carried over to the 4G mobile core network.

Currently, in the 3GPP standard, a tunnel between an eNodeB (Evolved Node B) and an S-GW (Serving Gateway) is mapped one by one to a tunnel between the S-GW and a P-GW (PDN Gateway). The S-GW only implements the GTP tunnel switching function. For a radio bearer (RB), a terminal accesses all the service data packets of a service server, no matter where the geographical location of the accessed service server is, the RB is required to forward the service data packets. That is, the service data packets are forwarded via the one-to-one mapped tunnels.

In actual network application, the server accessed by the terminal may be at a near end, or may be in a private network constructed by an operator or an Internet Service Provider (ISP), or may be the Internet. When the service server is at the near end, the service data packets of users still need to be forwarded from the S-GW to the P-GW via the one-to-one mapped tunnels. After subject to GTP tunnel processing via the P-GW, the service data packets may be forwarded to the service server, which causes a problem of alternate routing.

Meanwhile, most of the services the users use a default RB, the problem of alternate routing increases load of transmission network, increases delay of service, and has a negative effect on quality of service (QoS).

SUMMARY

In view of the above problems, embodiments of the present disclosure are proposed to provide a method for processing service data and an apparatus for processing service data to overcome or at least partially solve the above problems.

To solve the above problems, an embodiment of the present disclosure discloses a method for processing service data, which includes:

receiving an uplink service flow, wherein the uplink service flow includes a first tunnel identifier and a destination address;

determining a first tunnel mapping table corresponding to the first tunnel identifier, wherein the first tunnel mapping table includes the first tunnel identifier, one or more second tunnel identifiers corresponding to the first tunnel identifier, and one or more service addresses corresponding to each of the second tunnel identifiers;

searching a service address the same as the destination address from the first tunnel mapping table;

determining the second tunnel identifier of the uplink service flow based on the destination address if the searching is failed; and transmitting the uplink service flow to a service anchor corresponding to the second tunnel identifier of the uplink service flow, wherein the service anchor is configured to transmit the uplink service flow to a service server corresponding to the destination address.

Preferably, before the step of transmitting the uplink service flow to a service anchor corresponding to the second tunnel identifier of the uplink service flow, the method further includes:

adding the destination address as the service address into the first tunnel mapping table.

Preferably, the uplink service flow includes feature information of the uplink service flow, and the step of determining the second tunnel identifier of the uplink service flow based on the destination address includes:

allocating a service anchor to the uplink service flow according to the destination address and the feature information; and determining a tunnel identifier corresponding to the service anchor as the second tunnel identifier of the uplink service flow.

Preferably, before the step of determining the second tunnel identifier of the uplink service flow based on the destination address, the method further includes:

caching the uplink service flow.

Preferably, before the step of transmitting the uplink service flow to a service anchor corresponding to the second tunnel identifier of the uplink service flow, the method further includes:

acquiring a second tunnel identifier corresponding to the destination address from the first tunnel mapping table as the second tunnel identifier of the uplink service flow if the searching is successful.

Preferably, the step of transmitting the uplink service flow to a service anchor corresponding to the second tunnel identifier of the uplink service flow includes:

replacing the first tunnel identifier of the uplink service flow with the second tunnel identifier of the uplink service flow; and transmitting the replaced uplink service flow to the service anchor corresponding to the second tunnel identifier of the uplink service flow.

An embodiment of the present disclosure also provides a method for processing service data, the method including:

receiving a downlink service flow, wherein the downlink service flow includes a second tunnel identifier and a source address;

determining a second tunnel mapping table corresponding to the second tunnel identifier, wherein the second tunnel mapping table includes one first tunnel identifier, the second tunnel identifier, and one or more service addresses corresponding to the second tunnel identifier; and transmitting the downlink service flow to a terminal corresponding to the first tunnel identifier.

Preferably, before the step of transmitting the downlink service flow to a terminal corresponding to the first tunnel identifier, the method further includes:

searching a service address the same as the source address from the second tunnel mapping table; and adding the source address as the service address into the second tunnel mapping table if the searching is failed.

Preferably, the step of transmitting the downlink service flow to a terminal corresponding to the first tunnel identifier includes:

replacing the second tunnel identifier of the downlink service flow with the first tunnel identifier; and transmitting the replaced downlink service flow to the terminal corresponding to the first tunnel identifier.

An embodiment of the present disclosure also provides an apparatus for processing service data, the apparatus including:

an uplink service flow receiving module, configured to receive an uplink service flow, wherein the uplink service flow comprises a first tunnel identifier and a destination address;

a first tunnel mapping table determining module, configured to determine a first tunnel mapping table corresponding to the first tunnel identifier, wherein the first tunnel mapping table comprises the first tunnel identifier, one or more second tunnel identifiers corresponding to the first tunnel identifier, and one or more service addresses corresponding to each of the second tunnel identifiers;

a first searching module, configured to search a service address the same as the destination address from the first tunnel mapping table, and call a second tunnel identifier determining module if the searching is failed;

the second tunnel identifier determining module, configured to determine the second tunnel identifier of the uplink service flow based on the destination address; and an uplink service flow transmitting module, configured to transmit the uplink service flow to a service anchor corresponding to the second tunnel identifier of the uplink service flow, wherein the service anchor is configured to transmit the uplink service flow to a service server corresponding to the destination address.

Preferably, the apparatus further includes:

a first service address adding module, configured to add the destination address as the service address into the first tunnel mapping table.

Preferably, the uplink service flow includes feature information of the uplink service flow, and the second tunnel identifier determining module includes:

a service anchor allocating submodule, configured to allocate a service anchor to the uplink service flow according to the destination address and the feature information; and a service anchor tunnel identifier determining submodule, configured to determine a tunnel identifier corresponding to the service anchor as the second tunnel identifier of the uplink service flow.

Preferably, the apparatus further includes:

a caching module, configured to cache the uplink service flow.

Preferably, the apparatus further includes:

a second tunnel identifier acquiring module, configured to acquire a second tunnel identifier corresponding to the destination address from the first tunnel mapping table as the second tunnel identifier of the uplink service flow if the searching is successful.

Preferably, the uplink service flow transmitting module includes:

a second tunnel identifier replacing submodule, configured to replace the first tunnel identifier of the uplink service flow with the second tunnel identifier of the uplink service flow; and a service anchor transmitting submodule, configured to transmit the replaced uplink service flow to the service anchor corresponding to the second tunnel identifier of the uplink service flow.

An embodiment of the present disclosure also provides an apparatus for processing service data, the apparatus including:

a downlink service flow receiving module, configured to receive a downlink service flow, wherein the downlink service flow comprises a second tunnel identifier and a source address;

a second tunnel mapping table determining module, configured to determine a second tunnel mapping table corresponding to the second tunnel identifier, wherein the second tunnel mapping table comprises one first tunnel identifier, the second tunnel identifier, and one or more service addresses corresponding to the second tunnel identifier; and a downlink service flow transmitting module, configured to transmit the downlink service flow to a terminal corresponding to the first tunnel identifier.

Preferably, the apparatus further includes:

a second searching module, configured to search a service address the same as the source address from the second tunnel mapping table, and call a second service address adding module if the searching is failed; and the second service address adding module, configured to add the source address as the service address into the second tunnel mapping table.

Preferably, the downlink service flow transmitting module includes:

a first tunnel identifier replacing submodule, configured to replace the second tunnel identifier of the downlink service flow with the first tunnel identifier; and a terminal transmitting module, configured to transmit the replaced downlink service flow to the terminal corresponding to the first tunnel identifier.

To solve the above problems, an embodiment of the present disclosure discloses a computer program, which includes a computer-readable code. When the computer-readable code is operated on an electronic apparatus, the electronic apparatus is caused to execute the above method.

To solve the above problems, an embodiment of the present disclosure discloses a computer-readable medium, in which the foregoing computer program is stored.

The embodiments of the present disclosure include following advantages.

In the embodiments of the present disclosure, a forwarding node receives an uplink service flow, and searches a service address the same as the destination address of the uplink service flow from the first tunnel mapping table of the uplink service flow. In this way, the function of detecting whether the uplink service flow is a new uplink service flow is implemented. A second tunnel identifier is determined for the uplink service flow based on the destination address if the searching is failed, to implement the function of allocating a preferred tunnel to the new uplink service flow, and then this uplink service flow is transmitted to a corresponding service anchor. Through the embodiment of the present disclosure, the problem of adding load of transmission network caused by alternate routing due to failure of allocating a preferred path to an uplink service flow because of one-to-one mapping between a first tunnel and a second tunnel is solved, delay of service transmission is reduced, and quality of service is improved.

DESCRIPTION OF THE EMBODIMENTS

To make the foregoing objectives, features, and advantages of the present disclosure more apparent and lucid, the following further describes in detail the present disclosure with reference to the accompanying drawings and embodiments.

Figure 1:
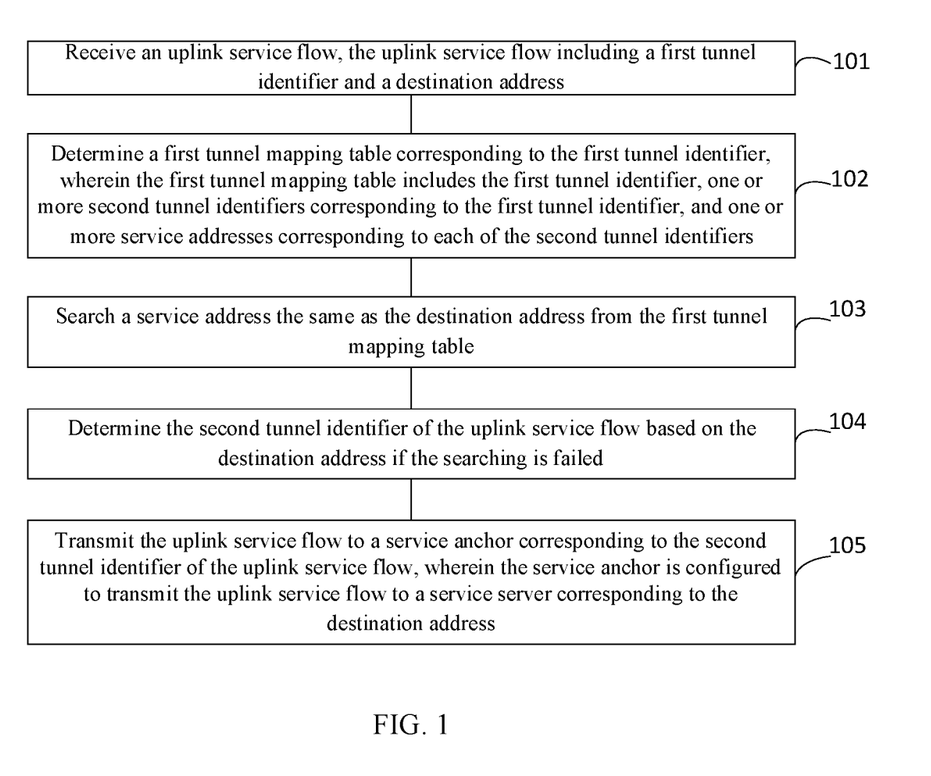
FIG. 1 is a step flowchart of a method for processing service data according to Embodiment I of the present disclosure.

Referring to FIG. 1, a step flowchart of a method for processing service data according to Embodiment I of the present disclosure is illustrated, wherein the method may specifically include:

Step 101: receiving an uplink service flow, wherein the uplink service flow includes a first tunnel identifier and a destination address;

Step 102: determining a first tunnel mapping table corresponding to the first tunnel identifier, wherein the first tunnel mapping table includes the first tunnel identifier, a plurality of second tunnel identifiers corresponding to the first tunnel identifier, and one or more service addresses corresponding to each of the second tunnel identifiers;

Step 103: searching a service address the same as the destination address from the first tunnel mapping table;

Step 104: determining the second tunnel identifier of the uplink service flow based on the destination address if the searching is failed; and Step 105: transmitting the uplink service flow to a service anchor corresponding to the second tunnel identifier of the uplink service flow, wherein the service anchor is configured to transmit the uplink service flow to a service server corresponding to the destination address.

In the embodiments of the present disclosure, a forwarding node receives an uplink service flow, and searches a service address the same as the destination address of the uplink service flow from the first tunnel mapping table of the uplink service flow. In this way, the function of detecting whether the uplink service flow is a new uplink service flow is implemented. A second tunnel identifier is determined for the uplink service flow based on the destination address if the searching is failed, to implement the function of allocating a preferred tunnel to the new uplink service flow, and then this uplink service flow is transmitted to a corresponding service anchor. Through the embodiment of the present disclosure, the problem of adding load of transmission network caused by alternate routing due to failure of allocating a preferred path to an uplink service flow because of one-to-one mapping between a first tunnel and a second tunnel is solved, delay of service transmission is reduced, and quality of service is improved.

Figure 2:
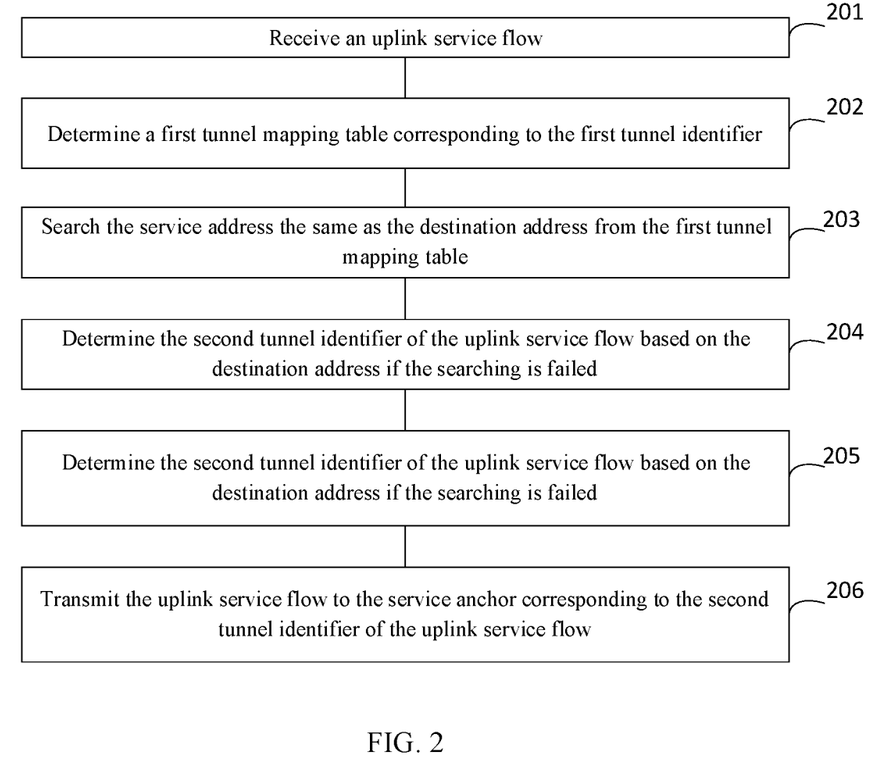
FIG. 2 is a step flowchart of a method for processing service data according to Embodiment II of the present disclosure.

Referring to FIG. 2, a step flowchart of a method for processing service data according to Embodiment II of the present disclosure is illustrated. The method of this embodiment of the present disclosure may be used in a service data processing scenario based on GTP (GPRS Tunneling Protocol).

The GTP may be broken down into three separate protocols, i.e., GTP-C, GTP-U, and GTP'.

The GTP-C is used to transmit signaling between GGSN (Gateway GPRS Support Node) and SGSN (Serving GPRS Support Node) in a GPRS core network, and allows the SGSN to represent a user to enable a session, disable the enabled session, adjust service quality parameters, or update the user's session just switched from another SGSN.

The GTP-U is used to transmit user data between a radio access network and a core network in the GPRS core network, and a user data packet may be transmitted in any format of IPv4, IPv6 or PPP (Point to Point Protocol).

The GTP' (GTP prime) uses the same information structure as the GTP-C and the GTP-U, but the GTP' has independent functions. Data may be transmitted from CDF (Charging Data Function) to CGF (Charging Gateway Function) of GSM (Global System for Mobile Communication) or UMTS (Universal Mobile Telecommunications System) using the GTP'. In most cases, this means that data of a plurality of independent network elements (such as GGSN) are transmitted to a central computer. In the latter case, the charging data may be more conveniently transmitted to a charging center of an operator.

Figure 3:
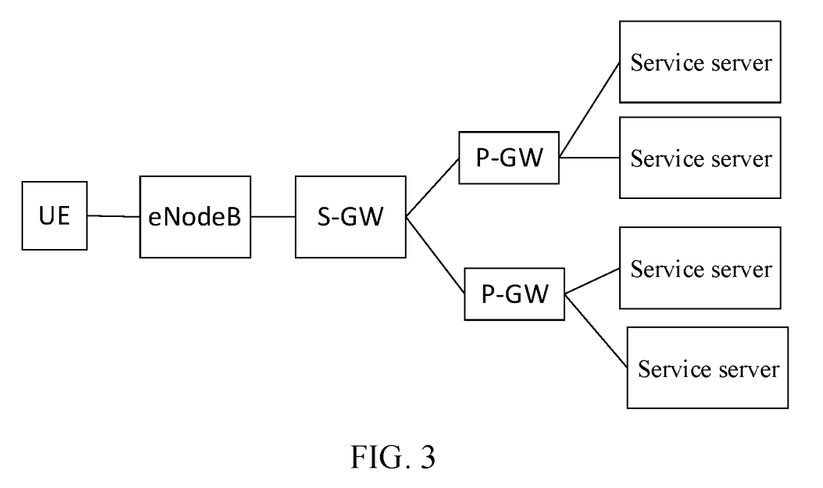
FIG. 3 is a schematic diagram of a packet core network according to the present disclosure.

The embodiments of the present disclosure may be applied to a packet core network such as a 4G mobile communication core network. The packet core network may include a terminal, a forwarding node, a service anchor, and a service server, etc.

Referring to FIG. 3, a schematic diagram of a packet core network is illustrated. In the 4G mobile communication core network, the terminal is UE (User Equipment), the forwarding node is S-GW, and the service anchor is P-GW. This network also includes an eNodeB, a service server, and an MME (Mobility Management Entity) (not shown in the figure).

As a user terminal in mobile communication, the UE may include a mobile phone, a smart terminal, a multimedia device, a streaming media device, and the like.

As an entity that participates in intermediate forwarding of service data, the eNodeB may map a radio bearer of an air interface to a GTP tunnel, and may completely encapsulate a service data packet into the GTP tunnel and transmit it to the S-GW.

The MME may complete functions such as terminal access, authentication, mobility management, and connection management, etc.

As an anchor for connecting the eNodeB and a forwarding node for forwarding service, the S-GW may be configured to process mobility of the terminal between the eNodeBs and forward user service plane data. In aspect of service flow processing, the S-GW is configured to forward service data.

As a PDN (Public Data Network) gateway, the P-GW may be in charge of terminal address allocation, routing of terminal service data, mapping between service data and radio bearer, and strategy control of services, etc.

The service server may be configured to respond to and process service requests to provide computing services.

The embodiments of the present disclosure are described from the forwarding node side, which specifically may include the following steps.

Step 201: receiving an uplink service flow.

Specifically, the forwarding node may receive the uplink service flow transmitted by the terminal via the eNodeB.

In specific implementation, the uplink service flow may be a data packet based on GTP encapsulation including a service packet, and the data packet may be transferred to the forwarding node via Ethernet.

As an example, the uplink service flow may include formats as shown in Table 1.

TABLE 1

| Ethernet frame header | IP header | UDP header | GTP header | Service packet |
|---|---|---|---|---|

The Ethernet frame header may include MAC (Media Access Control) address information of the uplink service flow.

The IP header may include IP address information such as a source IP address and a destination IP address of the uplink service flow.

The UDP header may include port information of the uplink service flow.

A frame of the GTP header may include formats as shown in Table 2.

TABLE 2

| Version number | Protocol type |
|---|---|
| Message type | |
| Length | |
| Length | |
| Tunnel Endpoint Identifier (TEID) | |
| Tunnel Endpoint Identifier (TEID) | |
| Tunnel Endpoint Identifier (TEID) | |
| Tunnel Endpoint Identifier (TEID) | |
| Sequence number | |
| Sequence number | |
| N-PDU number | |
| Next extension header type | |

Among fields of the GTP header, a key field is the TEID (Tunnel Endpoint Identifier) and the sequence number. The TEID uniquely corresponds to the endpoint of a tunnel. The sequence number is used for sorting the GTP service data packets by a receiving end. The sequence number may be an optional parameter. The S-GW, the P-GW, and eNodeB may not use this parameter.

As an example, the TEID may include an S1-TEID, an S5/S8-TEID, and the like. The S1-TEID is the identifier of an S1 interface, and the S5/S8-TEID is the identifier of an S5/S8 interface.

In a preferred embodiment of the present disclosure, the uplink service flow may include a first tunnel identifier, a destination address, and feature information, etc.

As an example, the first tunnel identifier may be the S1-TEID, the destination address may be an IP address of the service server, and the feature information may include, but is not limited to, a port number, a protocol type (TCP/UDP), and a service type (FTP (File Transfer Protocol), POP3 (Post Office Protocol-Version 3), SMTP (Simple Mail Transfer Protocol), IMAP (Internet Mail Access Protocol), HTTP (HyperText Transfer Protocol), and VoIP, or the like), etc.

Step 202: determining a first tunnel mapping table corresponding to the first tunnel identifier.

Specifically, the forwarding node may determine the first tunnel mapping table by using the first tunnel identifier as an index, and one first tunnel mapping table exists for a tunnel corresponding to each first tunnel identifier.

In this embodiment of the present disclosure, the first tunnel mapping table may include the first tunnel identifier, one or more second tunnel identifiers corresponding to the first tunnel identifier, and one or more service addresses corresponding to each of the second tunnel identifiers. Of course, the first tunnel mapping table may further include other parameter information of the uplink service flow, for example, a subnet mask, etc.

As an example, the second tunnel identifier may be the S5/S8-TEID, and the service address may be an IP address of the service server.

The first tunnel mapping table in this embodiment of the present disclosure may include the first tunnel identifier, one or more second tunnel identifiers, and one or more service addresses.

Specifically, one first tunnel identifier in the first tunnel mapping table may correspond to one or more second tunnel identifiers, and each second tunnel identifier may correspond to one or more service addresses.

As an example, the first tunnel mapping table may include formats as shown in Table 3.

TABLE 3

| S1-TEID | S5/S8-TEID | Service address |
|---|---|---|
| 1 | 2 | x.x.x.x |
| | | x.x.x.x |
| | 3 | x.x.x.x |

In Table 3, the first tunnel identifier S1-TEID is 1, and corresponds to two second tunnel identifiers S5/S8-TEID. The second tunnel identifier whose S5/S8-TEID is 2 corresponds to two service addresses, and the second tunnel identifier whose S5/S8-TEID is 3 corresponds to one service address.

Of course, those skilled in the art may arbitrarily set the format of the first tunnel mapping table according to actual demands, as long as the format can represent the correspondence between the first tunnel identifier, the second tunnel identifier, and the service address.

Step 203: searching the service address the same as the destination address from the first tunnel mapping table.

In specific implementation, both the destination address and the service address may be the IP address of the service server, and the forwarding node may read the destination address in the uplink service flow, and compare the destination address with the service address in the first tunnel mapping table to search the service address the same as the destination address.

Step 204: determining the second tunnel identifier of the uplink service flow based on the destination address if the searching is failed.

In specific implementation, when the service address the same as the destination address cannot be searched from the first tunnel mapping table, the uplink service flow may be determined as a new service flow, and the forwarding node may first cache the uplink service flow, and then may determine the second tunnel identifier based on the destination address.

In a preferred embodiment of the present disclosure, Step 204 may include the following substeps.

Substep S11: allocating a service anchor to the uplink service flow according to the destination address and the feature information.

In specific implementation, the forwarding node may preset a strategy for allocating a service anchor to a new uplink service flow. For example, the forwarding node may allocate a corresponding service anchor according to a geographic location of the service server, or the forwarding node may allocate a corresponding service anchor to a service flow of the destination address within the range of a certain IP address.

The forwarding node determines a preferred service anchor based on the preset strategy according to the destination address of the received uplink service flow in combination with the feature information extracted from the uplink service flow, wherein the service anchor may be an existing service anchor or a newly-added service anchor.

Substep S12: determining a tunnel identifier corresponding to the service anchor as the second tunnel identifier of the uplink service flow.

In an embodiment, if the service anchor is the newly-added service anchor, a tunnel identifier is allocated to the service anchor between the forwarding node and the service anchor through session management signaling. The tunnel identifier corresponding to the service anchor is determined as the second tunnel identifier of the uplink service flow, and a GTP tunnel for transmission of the service flow is established based on the second tunnel identifier.

Of course, in the present disclosure, a strategy for allocating a service anchor to a new uplink service flow may be preset at an MME side, a service anchor of this uplink service flow is determined at the MME side, and a tunnel identifier is allocated to the service anchor between the MME, the forwarding node and the service anchor through session management signaling.

In another embodiment, if the service anchor is the existing service anchor, a tunnel identifier corresponding to the service anchor is searched from the tunnel mapping table, and the tunnel identifier is determined as the second tunnel identifier of the uplink service flow.

Step 205: adding the destination address as the service address into the first tunnel mapping table.

Specifically, for the new uplink service flow, the first tunnel mapping table does not have a record of this uplink service flow, and the forwarding node may add the destination address as the record of this uplink service flow into the first tunnel mapping table.

For example, in the case where the service anchor is the existing service anchor, a record of the new uplink service flow is added into Table 1. The first tunnel identifier of the uplink service flow is 1, and the destination address is 192.168.111.10, and the determined second tunnel identifier is 2. In this case, first, the second tunnel identifier whose S5/S8-TEID is 2 is searched out from Table 1, and then a record of the destination address 192.168.111.10 is added into the service address corresponding to the second tunnel identifier whose S5/S8-TEID is 2. In this way, the first tunnel mapping table as shown in Table 4 may be obtained.

TABLE 4

| S1-TEID | S5/S8-TEID | Service address |
|---------|------------|-----------------|
| 1       | 2          | x.x.x.x         |
|         |            | x.x.x.x         |
|         |            | 192.168.111.10  |
|         | 3          | x.x.x.x         |

Of course, in the case where the service anchor is the newly-added service anchor, for example, a record of a new uplink service flow whose first tunnel identifier is 1, second tunnel identifier is 4 and destination address is 192.168.111.11 is added in Table 4. The forwarding node also needs to first add the tunnel identifier of the newly-added service anchor (i.e., the second tunnel identifier whose S5/S8-TEID is 4) is added into the first tunnel mapping table, and then the destination address 192.168.111.1 of the uplink service flow is added into the service address corresponding to the second tunnel identifier. In this way, the first tunnel manning table as shown in Table 5 may be obtained.

TABLE 5

| S1-TEID | S5/S8-TEID | Service address |
|---------|------------|-----------------|
| 1       | 2          | x.x.x.x         |
|         |            | x.x.x.x         |
|         |            | 192.168.111.10  |
|         | 3          | x.x.x.x         |
|         | 4          | 192.168.111.11  |

Correspondingly, when the service address the same as the destination address is searched out from the first tunnel mapping table. If the search succeeds, the second tunnel identifier corresponding to the destination address may be directly obtained, from the first tunnel mapping table, as the second tunnel identifier of the uplink service flow.

Step 206: transmitting the uplink service flow to the service anchor corresponding to the second tunnel identifier of the uplink service flow.

In specific implementation, the forwarding node determines the second tunnel identifier of the uplink service flow, and may transmit the uplink service flow to the corresponding service anchor via a tunnel corresponding to the second tunnel identifier.

The service anchor may be configured to transmit the uplink service flow to the service server corresponding to the destination address.

In a preferred embodiment of the present disclosure, Step 206 may include the following substeps.

Substep S21: replacing the first tunnel identifier of the uplink service flow with the second tunnel identifier of the uplink service flow; and Substep S22: transmitting the replaced uplink service flow to the service anchor corresponding to the second tunnel identifier of the uplink service flow.

Specifically, the forwarding node may replace the first tunnel identifier of the uplink service flow with the second tunnel identifier of the uplink service flow, and then transmit the replaced uplink service flow to the service anchor corresponding to the second tunnel identifier of the uplink service flow.

For example, when the first tunnel identifier is S1-TEID and the second tunnel identifier is S5/S8-TEID, the S1-TEID in the uplink service flow may be replaced with the S5/S8-TEID, and the replaced uplink service flow may be transmitted to the service anchor at an opposite end of the tunnel via the tunnel corresponding to the S5/S8-TEID.

Figure 4:
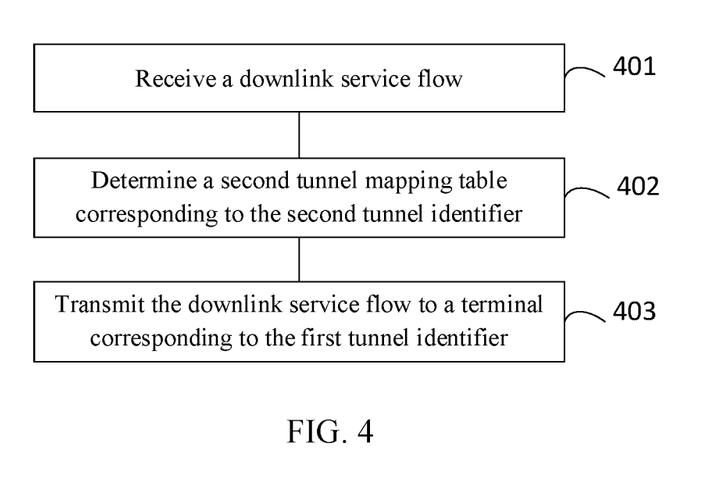
FIG. 4 is a step flowchart of a method for processing service data according to Embodiment III of the present disclosure.

Referring to FIG. 4, a step flowchart of a method for processing service data according to Embodiment III of the present disclosure is illustrated. The method of this embodiment of the present disclosure may be used in a service data processing scenario based on GTP (GPRS Tunneling Protocol).

The GTP may be broken down into three separate protocols, i.e., GTP-C, GTP-U, and GTP'.

The GTP-C is used to transmit signaling between GGSN (Gateway GPRS Support Node) and SGSN (Serving GPRS Support Node) in a GPRS core network, and allows the SGSN to represent a user to enable a session, disable the enabled session, adjust service quality parameters, or update the user's session just switched from another SGSN.

The GTP-U is used to transmit user data between a radio access network and a core network in the GPRS core network, and a user data packet may be transmitted in any format of IPv4, IPv6 or PPP (Point to Point Protocol).

The GTP' (GTP prime) uses the same information structure as the GTP-C and the GTP-U, but the GTP' has independent functions. Data may be transmitted from CDF to CGF of GSM or UMTS using the GTP'. In most cases, this means that data of a plurality of independent network elements (such as GGSN) are transmitted to a central computer. In the latter case, the charging data may be more conveniently transmitted to a charging center of an operator.

The embodiments of the present disclosure may be applied to a packet core network such as a 4G mobile communication core network. The packet core network may include a terminal, a forwarding node, a service anchor, and a service server, etc.

Referring to FIG. 3, a schematic diagram of a packet core network is illustrated. In the 4G mobile communication core network, the terminal is UE (User Equipment), the forwarding node is S-GW, and the service anchor is P-GW. This network also includes an eNodeB, a service server, and an MME (Mobility Management Entity) (not shown in the figure).

As a user terminal in mobile communication, the UE may include a mobile phone, a smart terminal, a multimedia device, a streaming media device, and the like.

As an entity that participates in intermediate forwarding of service data, the eNodeB may map a radio bearer of an air interface to a GTP tunnel, and may completely encapsulate a service data packet into the GTP tunnel and transmit it to the S-GW.

The MME may complete functions such as terminal access, authentication, mobility management, and connection management, etc.

As an anchor for connecting the eNodeB and a forwarding node for forwarding service, the S-GW may be configured to process mobility of the terminal between the eNodeBs and forward user service plane data. In aspect of service flow processing, the S-GW is configured to forward service data.

As a PDN (Public Data Network) gateway, the P-GW may be in charge of terminal address allocation, routing of terminal service data, mapping between service data and radio bearer, and strategy control of services, etc.

The service server may be configured to respond to and process service requests to provide computing services.

The embodiments of the present disclosure are described from the forwarding node side, which specifically may include the following steps.

Step 401: receiving a downlink service flow.

The forwarding node may receive a downlink service flow transmitted by the service server via the service anchor.

In specific implementation, the downlink service flow may be a data packet based on GTP encapsulation including a service packet, and the data packet may be transferred to the forwarding node via Ethernet.

As an example, the downlink service flow may include formats as shown in Table 6.

TABLE 6

| Ethernet frame header | IP header | UDP header | GTP header | Service packet |
|---|---|---|---|---|

The Ethernet frame header may include MAC (Media Access Control) address information of the downlink service flow.

The IP header may include IP address information such as a source IP address and a destination IP address of the downlink service flow.

The UDP header may include port information of the downlink service flow.

A frame of the GTP header may include formats as shown in Table 7.

TABLE 7

| Version number | Protocol type |
|---|---|
| Message type | |
| Length | |
| Length | |
| Tunnel Endpoint Identifier (TEID) | |
| Tunnel Endpoint Identifier (TEID) | |
| Tunnel Endpoint Identifier (TEID) | |
| Tunnel Endpoint Identifier (TEID) | |
| Sequence number | |
| Sequence number | |
| N-PDU number | |
| Next extension header type | |

Among fields of the GTP header, a key field is the TEID (Tunnel Endpoint Identifier) and the sequence number. The TEID uniquely corresponds to the endpoint of a tunnel. The sequence number is used for sorting the GTP service data packets by a receiving end. The sequence number may be an optional parameter. The S-GW, the P-GW, and eNodeB may not use this parameter.

As an example, the TEID may include an S1-TEID, an S5/S8-TEID, and the like. The S1-TEID is the identifier of an S1 interface, and the S5/S8-TEID is the identifier of an S5/S8 interface.

In a preferred embodiment of the present disclosure, the downlink service flow may include a second tunnel identifier and a source address. As an example, the second tunnel identifier may be the S5/S8-TEID, and the source address may be an IP address of the service server.

Step 402: determining a second tunnel mapping table corresponding to the second tunnel identifier.

The forwarding node may determine the second tunnel mapping table by using the second tunnel identifier as an index.

In this embodiment of the present disclosure, the second tunnel mapping table may include one first tunnel identifier, the second tunnel identifier, and one or more service addresses corresponding to the second tunnel identifier. Of course, the second tunnel mapping table may further include other parameter information of the downlink service flow, for example, a subnet mask, etc.

As an example, the first tunnel identifier may be the S1-TEID, and the service address may be an IP address of the service server.

Specifically, the forwarding node may search out one first tunnel identifier corresponding to the second tunnel identifier and one or more service addresses corresponding to the second tunnel identifier according to the second tunnel identifier.

As an example, the second tunnel mapping table may include formats as shown in Table 8.

TABLE 8

| S1-TEID | S5/S8-TEID | Service address |
|---------|------------|-----------------|
| 1       | 2          | x.x.x.x         |
|         |            | x.x.x.x         |
|         |            | 192.168.111.10  |

In Table 8, the second tunnel identifier S5/S8-TEID is 2, corresponds to one first tunnel identifier S1-TEID, and corresponds to two service addresses. The forwarding node may determine that the first tunnel identifier S1-TEID is 1 based on a fact that the second tunnel identifier S5/S8-TEID in the downlink service flow is 2.

Of course, those skilled in the art may arbitrarily set the format of the second tunnel mapping table according to actual demands, as long as the format can represent the correspondence between the second tunnel identifier, the first tunnel identifier, and the service address.

Step 403: transmitting the downlink service flow to a terminal corresponding to the first tunnel identifier.

In specific implementation, the forwarding node determines the first tunnel identifier of the downlink service flow, and may transmit the downlink service flow to the corresponding terminal via a tunnel corresponding to the first tunnel identifier.

In a preferred embodiment of the present disclosure, Step 403 may include the following substeps:

Substep S31: replacing the second tunnel identifier of the downlink service flow with the first tunnel identifier; and Substep S32: transmitting the replaced downlink service flow to the terminal corresponding to the first tunnel identifier.

Specifically, the forwarding node may replace the second tunnel identifier of the downlink service flow with the first tunnel identifier, and then transmit the replaced downlink service flow to the terminal corresponding to the first tunnel identifier.

For example, when the second tunnel identifier is S5/S8-TEID and the first tunnel identifier is S1-TEID, the S5/S8-TEID in the downlink service flow may be replaced with the S1-TEID, and the replaced downlink service flow may be transmitted to the terminal at an opposite end of the tunnel via the tunnel corresponding to the S1-TEID.

In a preferred embodiment of the present disclosure, before the Step 403, the method may further include the following steps.

A service address the same as the source address is searched from the second tunnel mapping table, and the source address is added as the service address into the second tunnel mapping table if the searching is failed.

In specific implementation, both the source address and the service address may be the IP address of the service server, and the forwarding node may read the source address in the downlink service flow, and compare the source address with the service address of the second tunnel mapping table to search the service address the same as the source address. When the service address the same as the source address cannot be searched from the second tunnel mapping table, the downlink service flow may be determined as a new service flow.

For the new downlink service flow, the second tunnel mapping table does not have a record of this downlink service flow, and the forwarding node may add the source address as the record of this downlink service flow into the second tunnel mapping table.

For example, a record of the new downlink service flow is added into Table 8. The second tunnel identifier of the downlink service flow is 2, and the source address is 192.168.111.12. In this case, first, the second tunnel identifier whose S5/S8-TEID is 2 is searched out from Table 8, and then a record of the source address 192.168.111.12 is added into the service address corresponding to the second tunnel identifier whose S5/S8-TEID is 2. In this way, the second tunnel mapping table as shown in Table 9 may be obtained.

TABLE 9

| S1-TEID | S5/S8-TEID | Service address |
|---------|------------|-----------------|
| 1       | 2          | x.x.x.x         |
|         |            | x.x.x.x         |
|         |            | 192.168.111.10  |
|         |            | 192.168.111.12  |

Correspondingly, when the service address the same as the source address is searched out from the second tunnel mapping table, i.e., if the search succeeds, the next step may be directly performed.

It should be noted that, for a brief description, method embodiments are described as a combination of a series of motions. However, those skilled in the art should know that the embodiments of the present disclosure are not limited by sequences of the motions described. This is because some steps may be performed by using other sequences or be performed simultaneously in accordance with the embodiments of the present disclosure. In addition, those skilled in the art should also learn that the embodiments described in the specification are preferred embodiments, and involved motions are not necessary for the embodiments of the present disclosure.

Figure 5:
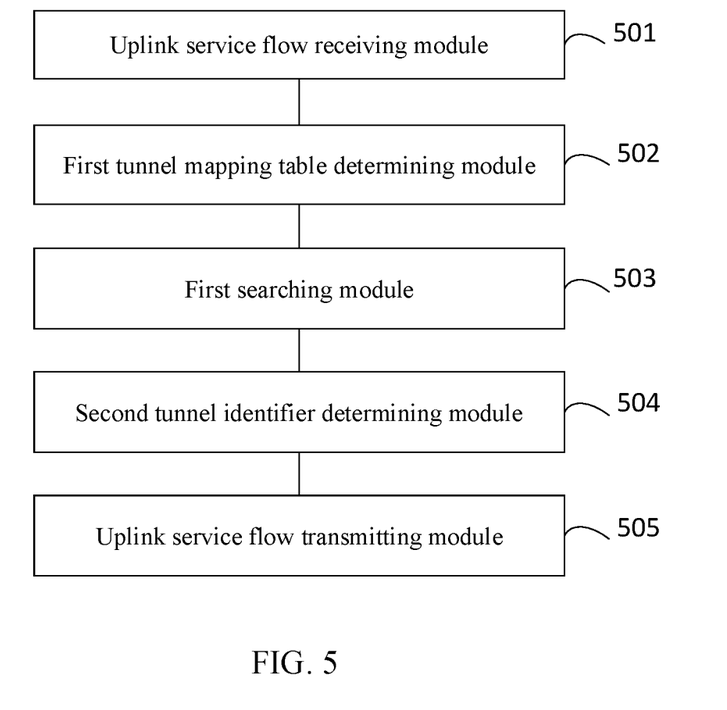
FIG. 5 is a structural block diagram of an apparatus for processing service data according to Embodiment I of the present disclosure.

Referring to FIG. 5, a structural block diagram of an apparatus for processing service data according to Embodiment I of the present disclosure is illustrated, wherein the apparatus may specifically include:

an uplink service flow receiving module 501, configured to receive an uplink service flow, wherein the uplink service flow includes a first tunnel identifier and a destination address;

a first tunnel mapping table determining module 502, configured to determine a first tunnel mapping table corresponding to the first tunnel identifier, wherein the first tunnel mapping table includes the first tunnel identifier, one or more second tunnel identifiers corresponding to the first tunnel identifier, and one or more service addresses corresponding to each of the second tunnel identifiers;

a first searching module 503, configured to search a service address the same as the destination address from the first tunnel mapping table, and call a second tunnel identifier determining module 504 if the searching is failed;

the second tunnel identifier determining module 504, configured to determine the second tunnel identifier of the uplink service flow based on the destination address; and an uplink service flow transmitting module 505, configured to transmit the uplink service flow to a service anchor corresponding to the second tunnel identifier of the uplink service flow, wherein the service anchor is configured to transmit the uplink service flow to a service server corresponding to the destination address.

In a preferred embodiment of the present disclosure, the apparatus further includes:

a first service address adding module, configured to add the destination address as the service address into the first tunnel mapping table.

In a preferred embodiment of the present disclosure, the uplink service flow includes feature information of the uplink service flow, and the second tunnel identifier determining module includes:

a service anchor allocating submodule, configured to allocate a service anchor to the uplink service flow according to the destination address and the feature information; and a service anchor tunnel identifier determining submodule, configured to determine a tunnel identifier corresponding to the service anchor as the second tunnel identifier of the uplink service flow.

In a preferred embodiment of the present disclosure, the apparatus further includes:

a caching module, configured to cache the uplink service flow.

In a preferred embodiment of the present disclosure, the apparatus further includes:

a second tunnel identifier acquiring module, configured to acquire a second tunnel identifier corresponding to the destination address from the first tunnel mapping table as the second tunnel identifier of the uplink service flow if the searching is successful.

In a preferred embodiment of the present disclosure, the uplink service flow transmitting module includes:

a second tunnel identifier replacing submodule, configured to replace the first tunnel identifier of the uplink service flow with the second tunnel identifier of the uplink service flow; and a service anchor transmitting submodule, configured to transmit the replaced uplink service flow to the service anchor corresponding to the second tunnel identifier of the uplink service flow.

Figure 6:
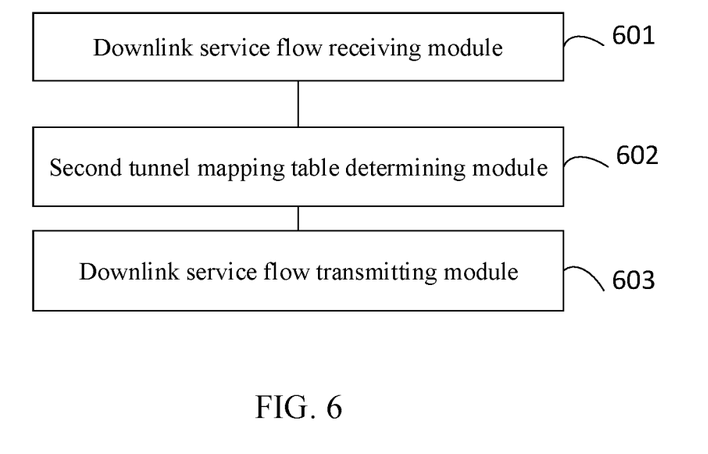
FIG. 6 is a structural block diagram of an apparatus for processing service data according to Embodiment II of the present disclosure.

Referring to FIG. 6, a structural block diagram of an apparatus for processing service data according to Embodiment II of the present disclosure is illustrated, wherein the apparatus may specifically include:

a downlink service flow receiving module 601, configured to receive a downlink service flow, wherein the downlink service flow includes a second tunnel identifier and a source address;

a second tunnel mapping table determining module 602, configured to determine a second tunnel mapping table corresponding to the second tunnel identifier, wherein the second tunnel mapping table includes one first tunnel identifier, the second tunnel identifier, and one or more service addresses corresponding to the second tunnel identifier; and a downlink service flow transmitting module 603, configured to transmit the downlink service flow to a terminal corresponding to the first tunnel identifier.

In a preferred embodiment of the present disclosure, the apparatus further includes:

a second searching module, configured to search a service address the same as the source address from the second tunnel mapping table, and call a second service address adding module if the searching is failed; and the second service address adding module, configured to add the source address as the service address into the second tunnel mapping table.

In a preferred embodiment of the present disclosure, the downlink service flow transmitting module includes:

a first tunnel identifier replacing submodule, configured to replace the second tunnel identifier of the downlink service flow with the first tunnel identifier; and a terminal transmitting module, configured to transmit the replaced downlink service flow to the terminal corresponding to the first tunnel identifier.

Device embodiments are basically similar to method embodiments, so description of device embodiments is relatively simple. Please see method embodiments which may serve as reference.

The embodiments in the specification are described in a progressive manner. Each embodiment is focused on difference from other embodiments. And cross reference is available for identical or similar parts among different embodiments.

Those skilled in the art should realize that an embodiment among the embodiments of the present disclosure may be provided as a method, an apparatus or a computer program product. Therefore, the embodiments of the present disclosure may use forms of a full hardware embodiment, a full software embodiment, or an embodiment in combination of software and hardware aspects. Furthermore, the embodiments of the present disclosure may use forms of computer program products implemented on one or more computer storage media (including but not limited to a magnetic disk memory, a CD-ROM, an optical memory or the like) which includes a computer program code.

The embodiments of the present disclosure are described with reference to flowcharts and/or block diagrams according to the method, terminal equipment (system) and computer program product of the embodiments of the present disclosure. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data processing equipment so as to generate a machine so that such a device configured to achieve functions designated in one or more flows of the flowchart and/or in one or more blocks of the block diagram is generated by means of instructions executed by computers or processors of other programmable data processing equipment.

These computer program instructions may be stored in a computer-readable memory which can lead a computer or other programmable data processing equipment to work in a particular way so that instructions stored in the computer-readable memory may generate a manufactured product comprising a command device which can achieve functions designated in one or more flows of the flowchart and/or in one or more blocks of the block diagram.

These computer program instructions may also be loaded onto computers or other programmable data processing equipment so that a series of operation steps are executed on the computers or other programmable equipment to generate a processing achieved by computers, thus providing steps for achieving functions designated in one or more flows of the flowchart and/or in one or more blocks of the block diagram by means of instructions executed by computers or other programmable equipment.

Each of devices according to the embodiments of the present disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the parts in the server according to the embodiments of the present disclosure. The present disclosure may further be implemented as equipment or device program (for example, computer program and computer program product) for executing some or all of the methods as described herein. Such program for implementing the present disclosure may be stored in the computer readable medium, or have a form of one or more signals. Such a signal may be downloaded from the Internet websites, or be provided on a carrier signal, or provided in any other form.

Figure 7:
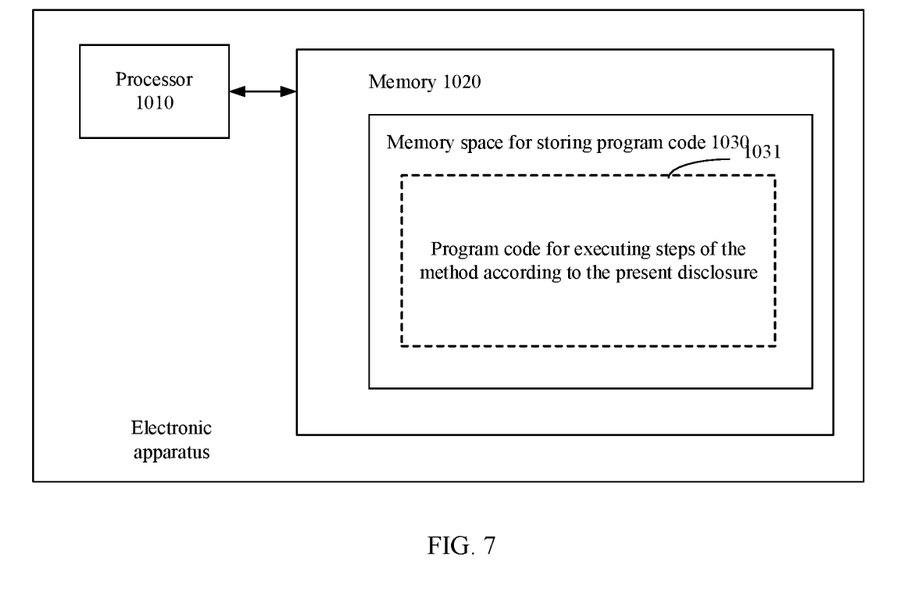
FIG. 7 schematically illustrates a block diagram of an electronic apparatus for performing the method according to the present disclosure.
Figure 8:
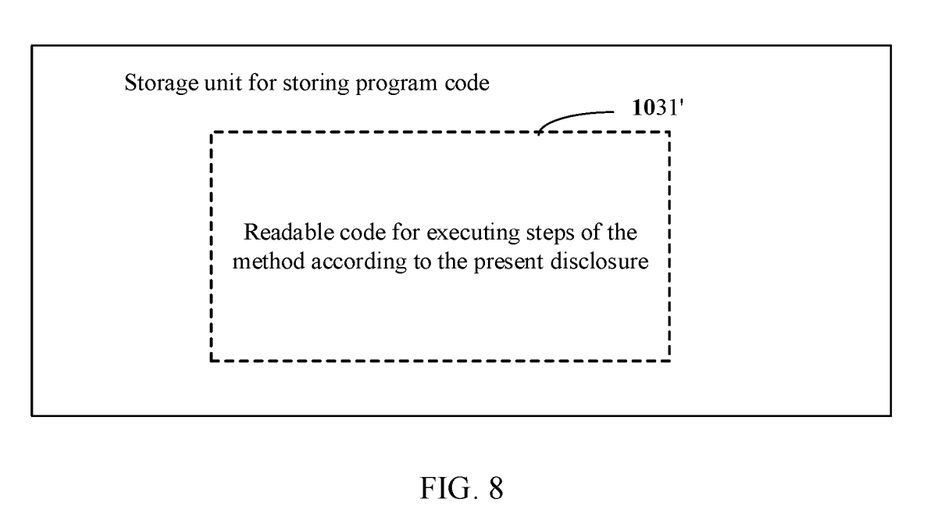
FIG. 8 schematically illustrates a memory cell for maintaining or carrying a program code for implementing the method according to the present disclosure.

For example, FIG. 7 illustrates an electronic apparatus, such as a server, that may perform the method for processing service data according to the present disclosure. Traditionally, the electronic apparatus comprises a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for executing program codes 1031 of any steps in the above methods. For example, the memory space 1030 for program codes may comprise respective program codes 1031 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 8. The memory cells may be provided with memory sections, memory spaces, etc., similar to the memory 1020 of the electronic apparatus as shown in FIG. 7. The program codes may be compressed for example in an appropriate form. Usually, the memory cell includes computer readable codes 1031' which can be read for example by processors 1010. When these codes are operated on the electronic apparatus, the electronic apparatus may be caused to execute respective steps in the method as described above.

Although preferred embodiments of the embodiments of the present disclosure have been described, those skilled in the art may make additional alterations and modifications on these embodiments as soon as they know the basic creative concept. Therefore, the appended claims are intended to be interpreted as comprising preferred embodiments and all alterations and modifications falling within the scope of the embodiments of the present disclosure.

Finally it should be explained that a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a terminal device comprising a series of elements not only includes these elements, but also includes other elements not listed explicitly, or also includes inherent elements of the process, the method, the merchandise or the terminal device. In the case of no more restrictions, elements restricted by a sentence "include a . . . " do not exclude the fact that additional identical elements may exist in a process, a method, a merchandise or a terminal device of these elements.

A method for processing service data and an apparatus for processing service data provided by the present disclosure are described above in detail. In this paper, the specific examples are used to describe the principle and the embodiments of the present disclosure. The description on the embodiments as above is used only to help understanding the method and its core ideas of the present disclosure; meanwhile, ordinary technical personnel skilled in the art can accord to the idea of the present disclosure to modify the concrete embodiments and the application scope. In summary, contents of the specification shall not be interpreted as limiting the present disclosure.

What is claimed is:

1. A method for processing service data, comprising:
   receiving an uplink service flow, wherein the uplink service flow comprises a first tunnel identifier and a destination address;
   determining a first tunnel mapping table corresponding to the first tunnel identifier, wherein the first tunnel mapping table comprises the first tunnel identifier, one or more second tunnel identifiers corresponding to the first tunnel identifier, and one or more service addresses corresponding to each of the second tunnel identifiers;
   searching a service address the same as the destination address from the first tunnel mapping table;
   determining the second tunnel identifier of the uplink service flow based on the destination address if the searching is failed; and
   transmitting the uplink service flow to a service anchor corresponding to the second tunnel identifier of the uplink service flow, wherein the service anchor is configured to transmit the uplink service flow to a service server corresponding to the destination address.

2. The method according to claim 1, wherein before the step of transmitting the uplink service flow to a service anchor corresponding to the second tunnel identifier of the uplink service flow, the method further comprises:
   adding the destination address as the service address into the first tunnel mapping table.

3. The method according to claim 1, wherein the uplink service flow comprises feature information of the uplink service flow, and the step of determining the second tunnel identifier of the uplink service flow based on the destination address comprises:
   allocating a service anchor to the uplink service flow according to the destination address and the feature information; and
   determining a tunnel identifier corresponding to the service anchor as the second tunnel identifier of the uplink service flow.

4. The method according to claim 3, wherein before the step of determining the second tunnel identifier of the uplink service flow based on the destination address, the method further comprises:
   caching the uplink service flow.

5. The method according to claim 1, wherein before the step of transmitting the uplink service flow to a service anchor corresponding to the second tunnel identifier of the uplink service flow, the method further comprises:
   acquiring a second tunnel identifier corresponding to the destination address from the first tunnel mapping table as the second tunnel identifier of the uplink service flow if the searching is successful.

6. The method according to claim 1, wherein the step of transmitting the uplink service flow to a service anchor corresponding to the second tunnel identifier of the uplink service flow comprises:
  replacing the first tunnel identifier of the uplink service flow with the second tunnel identifier of the uplink service flow; and
  transmitting the replaced uplink service flow to the service anchor corresponding to the second tunnel identifier of the uplink service flow.

7. A method for processing service data, comprising:
  receiving a downlink service flow, wherein the downlink service flow comprises a second tunnel identifier and a source address;
  determining a second tunnel mapping table corresponding to the second tunnel identifier, wherein the second tunnel mapping table comprises one first tunnel identifier, the second tunnel identifier, and one or more service addresses corresponding to the second tunnel identifier; and
  transmitting the downlink service flow to a terminal corresponding to the first tunnel identifier;
  wherein before the step of transmitting the downlink service flow to a terminal corresponding to the first tunnel identifier, the method further comprises:
  searching a service address the same as the source address from the second tunnel mapping table; and
  adding the source address as the service address into the second tunnel mapping table if the searching is failed.

8. The method according to claim 7, wherein the step of transmitting the downlink service flow to a terminal corresponding to the first tunnel identifier comprises:
  replacing the second tunnel identifier of the downlink service flow with the first tunnel identifier; and
  transmitting the replaced downlink service flow to the terminal corresponding to the first tunnel identifier.

9. An electronic apparatus for processing service data, comprising:
  a memory having instructions stored thereon;
  a processor configured to execute the instructions to perform operations comprising:
  receiving an uplink service flow, wherein the uplink service flow comprises a first tunnel identifier and a destination address;
  determining a first tunnel mapping table corresponding to the first tunnel identifier, wherein the first tunnel mapping table comprises the first tunnel identifier, one or more second tunnel identifiers corresponding to the first tunnel identifier, and one or more service addresses corresponding to each of the second tunnel identifiers;
  searching a service address the same as the destination address from the first tunnel mapping table;
  determining the second tunnel identifier of the uplink service flow based on the destination address if the searching is failed; and
  transmitting the uplink service flow to a service anchor corresponding to the second tunnel identifier of the uplink service flow, wherein the service anchor is configured to transmit the uplink service flow to a service server corresponding to the destination address.

10. The electronic apparatus according to claim 9, wherein the operations further comprise:
  adding the destination address as the service address into the first tunnel mapping table.

11. The electronic apparatus according to claim 9, wherein the uplink service flow comprises feature information of the uplink service flow, and the operation of determining the second tunnel identifier of the uplink service flow based on the destination address comprises:
  allocating a service anchor to the uplink service flow according to the destination address and the feature information; and
  determining a tunnel identifier corresponding to the service anchor as the second tunnel identifier of the uplink service flow.

12. The electronic apparatus according to claim 11, wherein the operations further comprise:
  cache the uplink service flow.

13. The electronic apparatus according to claim 9, wherein the operations further comprise:
  acquiring a second tunnel identifier corresponding to the destination address from the first tunnel mapping table as the second tunnel identifier of the uplink service flow if the searching is successful.

14. The electronic apparatus according to claim 9, wherein the operation of transmitting the uplink service flow to a service anchor corresponding to the second tunnel identifier of the uplink service flow comprises:
  replacing the first tunnel identifier of the uplink service flow with the second tunnel identifier of the uplink service flow; and
  transmitting the replaced uplink service flow to the service anchor corresponding to the second tunnel identifier of the uplink service flow.

* * * * *

UNITED STATES PATENT AND TRADEMARK OFFICE
CERTIFICATE OF CORRECTION

PATENT NO. : 10,819,537 B2
APPLICATION NO. : 16/466565
DATED : October 27, 2020
INVENTOR(S) : Haimin Li et al.

Page 1 of 1

It is certified that error appears in the above-identified patent and that said Letters Patent is hereby corrected as shown below:

On the Title Page

Item (73) please insert the Assignee City as --Beijing (CN)--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*